Patented Oct. 8, 1929

1,731,112

UNITED STATES PATENT OFFICE

ROLAND RUNKEL, OF MAINZ-MOMBACH, GERMANY, ASSIGNOR TO VEREIN FÜR CHEMISCHE INDUSTRIE AKTIENGESELLSCHAFT, OF FRANKFORT-ON-THE-MAIN, GERMANY

PRODUCTION OF CELLULOSE FROM HIGHLY-LIGNIFIED PLANTS

No Drawing. Application filed May 11, 1927, Serial No. 190,647, and in Germany May 20, 1926.

The attempts hitherto made to produce cellulose on a manufacturing scale from highly lignified plants of all kinds, such as beech wood have failed by reason of the uneconomical character of the process, and to some extent also on account of the inferior quality of the final product. With the alkali process of dissociation, the susceptibility of the beechwood cellulose resulted in a low yield from a high consumption of chemicals; whilst, in the case of the acid process, the cellulose proved unbleachable, or the bleach was deficient in permanence. Similar adverse conditions have also hitherto prevented the application of bamboo for the production of cellulose.

According to the invention the novel characteristic in the dissociation of woods of the kind specified, consists in a combination of the features that the raw material, which is first comminuted and steeped in basic or acid liquor in known manner, and is soft and elastic in character, is reduced to a fibrous condition and is subjected to a plurality of successive oxidation and chlorination processes; and further in that reaction liquid is removed from the raw materials between the multistage oxidation and chlorination processes and then replaced by fresh reaction liquid.

It has hitherto been found impossible, in practice, to apply to highly lignified raw materials, such as hardwoods, the method of dissociation with chlorine, which has acquired a certain importance in the production of cellulose from grasses. The low penetrative action of the chlorine necessitates the comminution of the wood to such an extent as to render the method uneconomical from the outset, on the one hand by reason of the high cost of comminution, and also on account of the numerous severed fibres (e. g. wood wool) which result in a reduction in the yield and quality.

The new process of this invention obviates these defects and, after a suitable preliminary treatment, enables the main dissociation agent, chlorine, to exert such an intensive, and at the same time protective, action that a rapid and uniform dissociation is obtained.

The chemicals for these solutions may have an alkaline or acid reaction in solution. Those of alkaline character comprise, for example, the hydroxides of the alkalis and alkaline earths, and sodium carbonate; whilst those of acid character include certain acids, hydrolytically dissociated salts such as zinc chloride, magnesium chloride and calcium thiocyanate. Phenols, or solutions containing same, etc., also come into consideration.

It is not essential that these substances should even partially effect the disssociation, that is to say the elimination of the incrusting materials, the sole criterion of their utility being their capacity for exerting a softening action into the interior. The duration of heating and the temperature employed vary with the specific properties of the chemicals used, which must not attack the cellulose.

The requisite concentration of these solutions, which may be repeatedly used, and may, on occasion, be regenerated, varies with the nature of the chemicals and with the duration of boiling. For a boiling period of about 5 hours, the concentration of the caustic soda solution may be up to 5%, if 1000 grams of solution be used as boiling liquor for 200 grms. of wood, calculated, as in an absolutely dry state.

The material softened in the above manner can now be reduced in a short time to the state of fibre in suitable apparatus, such as an edge-runner mill, without injury to the cellulose, and in a condition suitable for the subsequent chlorination process.

The chlorination is effected in several stages. In the first place, chlorine is passed continuously through the fibrous material, which is suspended in water and kept in agitation, until the addition of alkali gives a reaction which is manifested by a uniform brownish-red coloration throughout the entire fibrous mass. The progress of chlorination may also be followed by the titrimetric determination of the amount of hydrochloric acid formed. After the chlorination has continued for about an hour, the supply of chlorine is stopped and the mass is separated from the liquid. This takes place when the chlorination and oxidation process has already attained an advanced stage in which the material has preferably already assumed a softened or elastic condition; and the removal of the reaction liquid is effected, not by washing the reaction liquid out with water, but by treating the material in presses, dehydrating machines or the like, until its content of dry substance attains about 25-50%.

The chlorinated fibrous mass, extensively freed from liquid, will now quickly yield considerable quantities of dark brown cellulose on being worked about in a weak alkaline bath. On again separating it from the liquid, treating it with a fresh quantity of dilute alkali and passing chlorine once more through the agitated mixture, the colour will rapidly become lighter, and the state of full bleach is sometimes attained during this stage, even before the acid reaction occurs.

On the other hand, if—as depends on the character of the raw material used—the mass still contains considerable quantities of residual fragments and bundles of fibres, the treatment is repeated by pressing or centrifuging, chlorinating, pressing and afterwards treating with alkali.

Certain chlorine carriers, such as protochloride of tin, may be employed in the chlorination treatment, their use accelerating the process.

The fully bleached cellulose resulting from the process and still containing a small percentage of residuel fragments, is separated from the latter and further treated in the usual way. The yield obtained, in the case of beech-wood for example, is not inferior to that from pinewood.

The following examples will serve to elucidate the dissociation process more fully.

1. 200 kilograms of beechwood, broken down into small lumps are placed in 1000 litres of water containing 25 kg. of caustic soda and 25 kg. of quick lime in solution or suspension, and are boiled for about 8 hours, under ordinary pressure, in a vessel provided with a reflux condenser. The soft mass is then separated from the liquid, and is reduced to the state of fine fibres by a short treatment in an edge-runner mill. The mass, impregnated with alkali, is transferred to a mixing and stirring vessel of any kind, which is filled with water, and a moderate current of chlorine is passed through it continuously until the reaction of the liquid has become acid and a sample of the mass assumes a brownish red coloration on addition of alkali. When this occurs, the supply of chlorine is discontinued, the liquid is removed in a centrifuge, and the fibrous mass is placed in about 2000 litres of a caustic soda solution of 0.5-1% strength, in which it is agitated, for example in a papermaking machine. The greater proportion of the reddish-brown bundles of fibres separates into a finely fibrous material very soon after coming in contact with the alkali. According to the original state of comminution and the other characteristics of the raw material, a pure white cellulose will be obtained after another centrifuging, re-treatment with alkali and a slow passage of chlorine gas, or after a further repetition of the same treatment.

2. 200 kilograms of comminuted bamboo are boiled for 2 hours in 1 cb. metre of a 50% solution of zinc chloride. After separation from the liquid, the mass is thoroughly reduced to fibre as in Example 1, being then placed in 2000-3000 litres of water and treated, whilst in a state of motion, with a current of chlorine gas, as in Example 1, for about an hour. The mass is pressed or centrifuged in exactly the same way as in the first example, and is treated with 2-3 cb. metres of a ½-1% alkali liquor until a perfectly white, bleached cellulose is obtained, which is effected by passing chlorine through the suspension, a repetition of the same treatment being necessary on occasion.

3. 220 grms. of air-dried beechwood shavings are allowed to stand in 100 c.cm. of a dilute solution of caustic soda, if necessary with the addition of 200 grms. of sodium chloride, for 24 hours at air temperature or reduced temperature. The soaked material is then, after the separation of the fluid in any known disintegrating device, for example an edge mill, separated into fibres and then subjected to a chlorine decomposition process of known kind, with special advantage, however, in such a manner that several chlorination stages are employed with only a pressing out or centrifuging after each chlorination process and after each lixiviating stage instead of a washing out. The further treatment up to the production of a white cellulose takes place as in Examples 1 and 2.

What I claim is:—

1. Process for dissociation of strongly incrusted or highly lignified vegetable raw materials, such as beechwood, bamboo, or the like, comprising comminuting and chemically softening the raw materials substantially at atmospheric pressure, effecting the chemical reduction of said softened material to the state of fibers and subjecting the fibers to successive multi-stage oxidation and chlorination.

2. Process according to claim 1, comprising freeing the raw materials from reaction liquid after each step of the multi-stage oxidation and chlorination treatment and then treating them with a fresh quantity of reaction liquid.

3. Process as claimed in claim 1, comprising freeing the raw materials from reaction liquid after each step of the multi-stage oxidation and chlorination treatment, then treating them with a fresh quantity of reaction liquid, the chlorination being effected by first passing chlorine gas in known manner through the agitated aqueous suspension of the fibrous material, then mechanically freeing the fibers from the suspension liquid, extracting it with bases and then repeating the mechanical step of freeing the fibers from the suspension liquid.

4. Process as claimed in claim 1, comprising freeing the raw materials from reaction liquid after each step of the multi-stage oxidation and chlorination treatment, then treating them with a fresh quantity of reaction liquid, the chlorination being effected by first passing chlorine gas in known manner through the agitated aqueous suspension of the fibrous material, then mechanically freeing the fibers from the suspension liquid, extracting it with bases and then repeating the mechanical step of freeing the fibers from the suspension liquid, the oxidation, chlorination and centrifuging, or pressing as well as the extraction with bases, recentrifuging or repressing being carried on in suitable vessels repeatedly and in the same order of succession.

5. Process as claimed in claim 1, comprising freeing the raw materials from reaction liquid after each step of the multi-stage oxidation and chlorination treatment, then treating them with a fresh quantity of reaction liquid, the chlorination being effected by first passing chlorine gas in known manner through the agitated aqueous suspension of the fibrous material, then mechanically freeing the fibers from the suspension liquid, extracting it with bases and then repeating the mechanical step of freeing the fibers from the suspension liquid, the oxidation, chlorination and centrifuging, or pressing as well as the extraction with bases, recentrifuging or repressing being carried on in suitable vessels repeatedly and in the same order of succession, including employing catalyzers in the chlorination treatment.

In testimony whereof I have signed my name this 2d day of May, 1927.

Dr. ROLAND RUNKEL.